United States Patent [19]

Boyles et al.

[11] Patent Number: 5,511,208
[45] Date of Patent: Apr. 23, 1996

[54] LOCATING RESOURCES IN COMPUTER NETWORKS HAVING CACHE SERVER NODES

[75] Inventors: Ray W. Boyles, Apex; Michael F. Gierlach, Raleigh, both of N.C.; Prabandham M. Gopal, Wayne, N.J.; Robert Sultan, Richterswil, Switzerland; Gary M. Vacek, Raleigh, N.C.

[73] Assignee: International Business Machines Corporation, Armonk, N.Y.

[21] Appl. No.: 35,852

[22] Filed: Mar. 23, 1993

[51] Int. Cl.⁶ .......................... G06F 13/14; G06F 15/173
[52] U.S. Cl. ............ 395/800; 364/242.94; 364/284.4; 364/DIG. 1; 364/940.64; 395/600; 395/280
[58] Field of Search ................................ 395/800, 600, 395/325, 200, 200.6, 200.12, 650

[56] References Cited

U.S. PATENT DOCUMENTS

| | | | |
|---|---|---|---|
| 4,914,571 | 4/1990 | Baratz et al. | 395/600 |
| 5,109,483 | 4/1992 | Baratz et al. | 395/200 |
| 5,185,860 | 2/1993 | Wu | 395/200 |
| 5,222,242 | 6/1993 | Choi et al. | 395/800 |
| 5,224,205 | 6/1993 | Dinkin et al. | 395/200 |
| 5,282,270 | 1/1994 | Oppenheimer et al. | 395/200 |

*Primary Examiner*—Thomas G. Black
*Assistant Examiner*—Hosain T. Alam
*Attorney, Agent, or Firm*—Gerald R. Woods

[57] ABSTRACT

A computer network in which resources are dynamically located through the use of LOCATE requests includes multiple cache server nodes, network nodes which have an additional obligation to build and maintain large caches of directory entries. Cache server nodes play a key role in the LOCATE process and can prevent redundant network-wide broadcasts of LOCATE requests. Where an origin cache server node receives a request from a served node, the cache server node searches its local directories first, then forwards the request to alternate cache server nodes if necessary. If the necessary information isn't found locally or in alternate cache server nodes, the LOCATE request is then broadcast to all network nodes in the network. If the broadcast results are negative, the request is forwarded to selected gateway nodes to permit the search to continue in adjacent networks.

7 Claims, 9 Drawing Sheets

LOCATING RESOURCES IN COMPUTER NETWORKS HAVING CACHE SERVER NODES

BACKGROUND OF THE INVENTION

The present invention relates to computer networks and more particularly to methods and apparatus for locating resources in such networks where certain nodes in the networks are defined as cache server nodes.

A computer network consists of a set of data processing systems that are connected to one another to enable end users at different systems to exchange data. Each system, which can generically be referred to as a node, consists of computer components (hardware) and computer programs (software) that run on the hardware. The systems can be interconnected through a variety of electrical or optical transmission media. Such media are generically referred to as links.

The nodes in a network can be characterized by the functions which they perform. An Advanced Peer-to-Peer Networking or APPN architecture developed by the assignee of the present invention employs two major types of nodes, end nodes and network nodes. An end node may include input/output devices such as display terminals, intelligent workstations, printers and the like and a processor which supports the operation of such devices. A network node may include the same kinds of devices but further includes hardware and software which allows it to perform additional communication-related functions. Typical network or communication-related functions include selecting and setting up routes or paths between remote systems and maintaining a directory or database of nodes and links throughout the network. The nodes and the links may be referred to, collectively, as network resources. The physical configuration, logical configuration and characteristics of the various nodes and links are referred to collectively as the topology of the network.

Each of the nodes contains one or more network addressable units, each containing a resource that can be a source or target for communications directed through the network between end users. The term "end user", while usually associated with human users, is intended to represent a computer program which is executed at a network addressable unit to permit a human user at the unit to interact with the network. The term logical unit or LU may be used to refer to an interface between an end user and the network.

If a network node is to select a route or set up a logical connection to a particular network resource, the network node obviously needs to know where that resource is located and whether it is available. The network node also ordinarily requires information about the characteristics of the resource.

It is, at least theoretically, possible to set up a network in which information about every resource is maintained by a single network operator. The single network operator would communicate such information on an as-needed basis to any network node trying to select a route or set up a connection.

The use of a single network operator is practical only for small, relatively static networks. Few networks can be characterized as small and static. Networks are typically large and/or dynamic; that is, resources are constantly being added, deleted or moved or assuming new characteristics (available/not available) while remaining in the network. In a typical network, the volume and frequency of resource changes could overwhelm a single network operator, resulting either in delays or use of outdated information in route selection or session setup attempts.

A process for permitting a network node to dynamically locate a target resource is described in U.S. Pat. No. 4,914,571, issued Apr. 3, 1990, and assigned to the assignee of the present invention. According to the teachings of that patent, a network node responsible for setting up a session between a source logical unit and a target logical unit obtains current information about the target by performing a search process or LOCATE operation at the beginning of each new session. The network node does not need to rely on any local directory or resource records or on a single network operator to provide the necessary information about the target.

While the process described in the patent does assure that current information about resource location/characteristics is retrieved each time it is needed, the process is not without its drawbacks. According to the patent,i the target resource information is verified during each LOCATE operation by querying a node defined as "owning" the target resource. Waiting for a LOCATE operation to be performed every time a session is established may lead to delays in completing the session connections. Moreover, full LOCATE searches increase network traffic "overhead" since those searches may require network-wide broadcasts which take network time that could otherwise be devoted to transferring data between end users.

A certain amount of "overhead" is eliminated by a modified LOCATE process described in pending U.S. Pat. No. 5,222,242 issued Jun. 22, 1993, and assigned to the assignee of the present invention. In the modified LOCATE process, it is not always necessary to verify the location and characteristics of a target resource by querying the node which "owns" the resource. Under certain conditions, a network node serving the "owning" node or a network node serving the originator of the LOCATE request may rely on cached information in responding to a LOCATE request. This modified process, described as a selective verification process, reduces the amount of network traffic that must be dedicated to LOCATE operations.

As networks continue to grow in size and complexity, neither the original LOCATE process described in U.S. Pat. No. 4,914,571 nor the modified LOCATE process described in U.S. Pat. No. 5,222,242 may be able to guarantee that necessary resource information will be provided within system response time limits insisted upon by network users.

SUMMARY OF THE INVENTION

The present invention is a system for permitting a target resource in a computer network to be dynamically located in a series of operations which reduce network traffic while assuring that current resource information is available for sessions to be established.

The operations are performed in a computer network which includes a plurality of nodes, two or more of which are defined as cache server nodes. Cache server nodes are nodes which are responsible for caching or storing information about all or a subset of the network's resources. Every node in the network is either a cache server node itself or is served by a cache server node. When a LOCATE request is received by a cache server node serving the node originating the request, the origin cache server node first searches its local resource directories for an entry defining the location and characteristics of the target resource. If no suitable local entry is found, the origin cache server node directs the LOCATE requests to one or more alternate cache server nodes. If no suitable reply is returned from the alternate cache server nodes, the LOCATE request is broadcast to other nodes in the network.

BRIEF DESCRIPTION OF THE DRAWINGS

While the following technical description concludes with claims particularly pointing out and distinctly claiming that which is regarded as the present invention, details of a preferred embodiment of the invention may be more readily ascertained from the following technical description when read in conjunction with the accompanying drawings wherein:

FIG. 4, consisting of FIGS. 4A through 4E taken together, is a more detailed flow chart of steps that are performed at an origin cache server that has received a LOCATE request.

TECHNICAL DESCRIPTION

Figure 1:
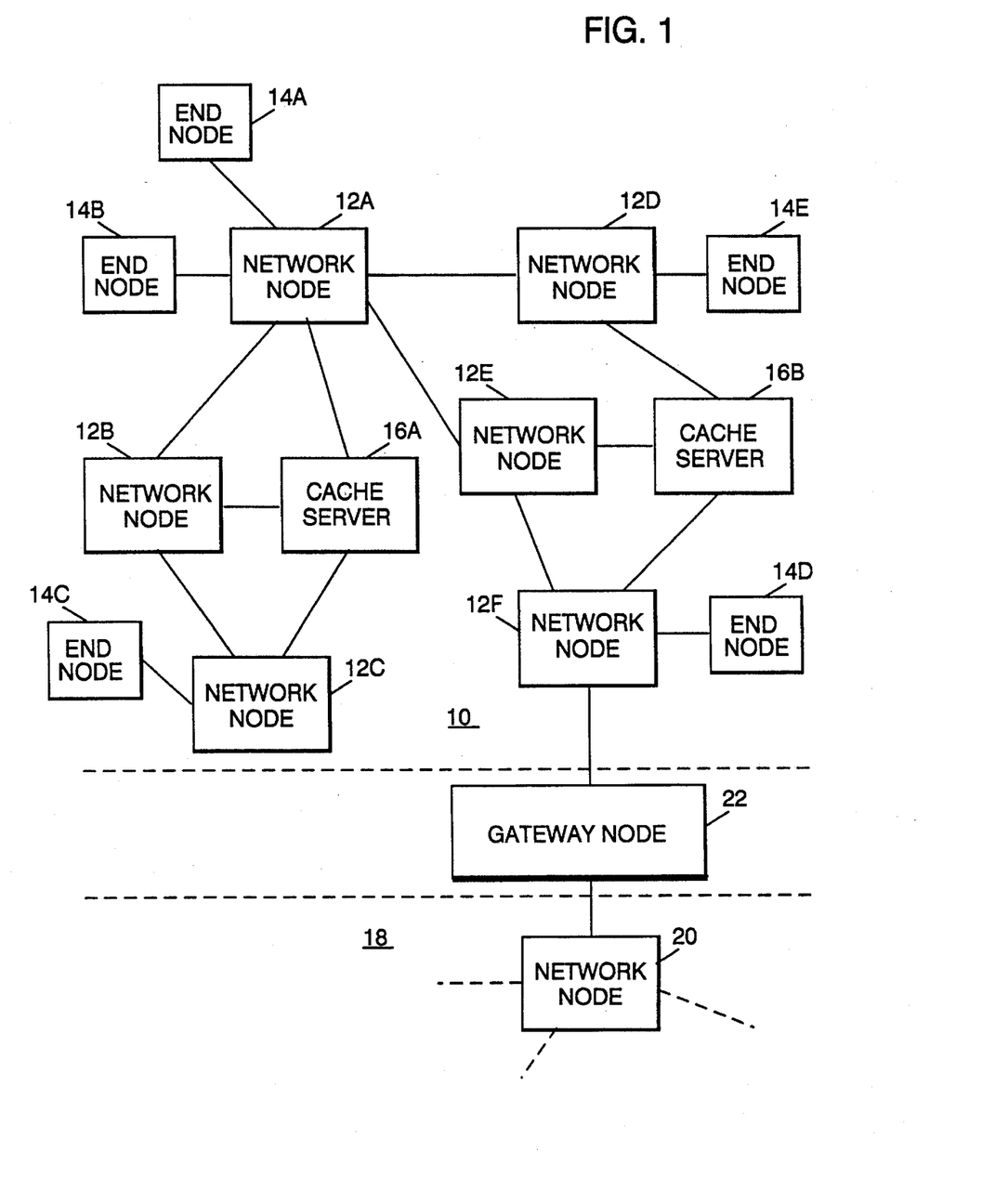
FIG. 1 is a high level block diagram of a computer network in which the present invention may be practiced.

FIG. 1 is a high level representation of a computer network in which LOCATE requests may be processed in accordance with the present invention to establish the location and characteristics of target resources. The terms used in describing the network and its components are consistent with terminology used to describe computer networks which implement Systems Network Architecture (SNA), a well-known, open computer architecture. The Advanced Peer-to-Peer Networking or APPN architecture mentioned earlier is an extension of the SNA architecture.

Comprehensive descriptions of the SNA architecture may be found in a number of publications, including *IBM Systems Network Architecture—Format and Protocol Reference Manual: Architecture Logic* (SC30-3112) or *SNA: IBM's Networking Solution*, James Martin and Kathleen K. Chapman, Prentice-Hall, Inc., Englewood Cliffs, New Jersey. While publications such as these may allow a reader to appreciate some of the subtleties of SNA, the publications are not needed to understand or practice the present invention. There is no intent to incorporate the contents of such publications by reference.

Block 10 generally identifies a first network which includes a set of network nodes 12A through 12F, another set of end nodes 14A through 14E and a pair of cache server nodes 16A and 16B. A limited number of the various types of nodes are illustrated in the drawing for the sake of simplicity. An actual computer network would include many more nodes of the various types shown in the drawing. As noted earlier, end nodes are actually data processing systems which typically perform input/output or local processing functions rather than communications-related functions. Network nodes are data processing systems which typically are capable of performing end node functions but which additionally are capable of performing communications-related functions such as route selection, session setups and network topology database maintenance.

Cache server nodes 16A and 16B are a special type of network node. In addition to performing typical network node functions, cache server nodes perform the additional function of caching or storing information about all or a subset of all of the network's resources. The cache server nodes play a major role in LOCATE operations, to be described in detail below.

Network 10 may be interconnected to other networks, such as network 18, through gateway nodes like node 22. A gateway node is a data processing system which is programmed to handle internet-working addressing problems and the like.

Although not illustrated in FIG. 1, network 10 is logically organized into a number of domains or areas of control. While the specific meaning of the term "domain" may vary from one system architecture to another, a domain generally consists of a node having a control point and all nodes which use the services of that control point. For example,i in an APPN system, each network node will include a control point which provides certain services not only to the network node but also to most, if not all, of the end nodes that are directly attached to the network node. Thus, the domain of network node 12A would include all of the resources in the network node itself plus all of the resources at end nodes 14A and 14B.

Figure 2:
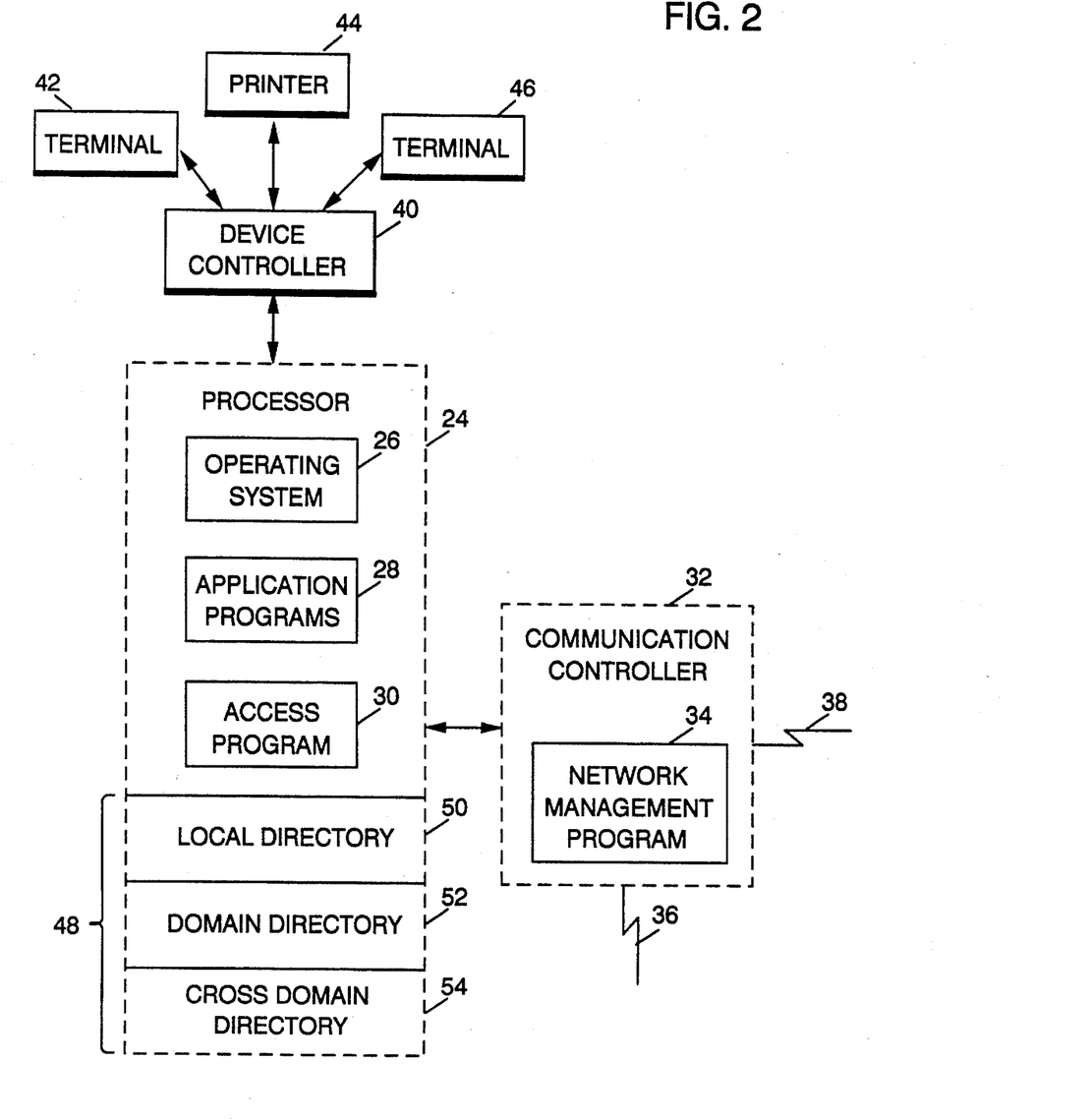
FIG. 2 is a more detailed block-level representation of the hardware and software components of a typical node.

FIG. 2 is a block diagram of hardware and software components of a given type of node. Any node generally includes a processor 24 which operates under the control of operating system software 26 and which executes one or more application programs 28 at the request of end users. End user input/output for processor 24 can be provided through devices such as terminals 42 and 46 or printer 44, which are connected to the processor through a device controller 40. Where processor 24 is part of a computer network, the processor will execute an access program, such as program 30. The access program controls the transfer of data to and from a communication controller 32, which may operate under the control of a network management program 34. Communication controller 32 is connected to other remote processors or communications controllers through links 36 and 38.

The hardware and software components described in the preceding paragraph are conventional, general purpose components which are available from a number of sources. For example, processor 24 may be a System/390 processor having an MVS/ESA operating system and an ACF/VTAM access program. Device controller 40 may be a Type 3174 Establishment Controller and communication controller 32 may be a Type 3745 Communication Controller. All of the specifically identified components are available from the International Business Machines Corporation. Functionally equivalent components may be available from other sources.

The same basic components may be used in either network nodes or end nodes. Network nodes would include additional programs to permit the node to perform specific functions, such as route selection, session control and topology database maintenance.

A third type of node is employed in systems in which the present invention is practiced. Thins third type is a cache server mode which, in a preferred embodiment of the invention constitutes a network node capable of performing normal network node functions but which is also additionally obligated to build and maintain a large cache of directory entries, to act as a focal point for cached resource location data and to service LOCATE requests received from other nodes in the network. By assuming a primary role in locating resources and then caching the results, a cache server node prevents redundant network-wide broadcasts of LOCATE requests.

A cache server node preferably includes a local directory for storing resource records for resources directly "owned" by the cache server node, a domain directory for storing resource records for resources owned by nodes served by (or in the domain of) the cache server node, and a cross-domain directory for storing resource records for resources located in the network but outside the local domain.

Referring momentarily to FIG. 1 and particularly to cache server node 16A, the local directory for node 16A would be limited to resources owned directly by that node. The domain directory would include resources residing in the cache server node and any attached end nodes served by the cache server node. The cross-domain directory would include records for all resources in network 10 other than the resources recorded in the local or domain directories. The local, domain and cross-domain directories maintained by cache server node 16B would be comparable to those maintained by node 16A but for nodes and resources served by node 16B. For purposes of back-up and high availability, the cross-domain directory of each cache server node would likely include directory records for local and domain resources of the other cache server nodes.

A significant feature of the present invention is that each network includes multiple cache server nodes which work together as described below in order to complete LOCATE operations efficiently and rapidly.

Figure 3:
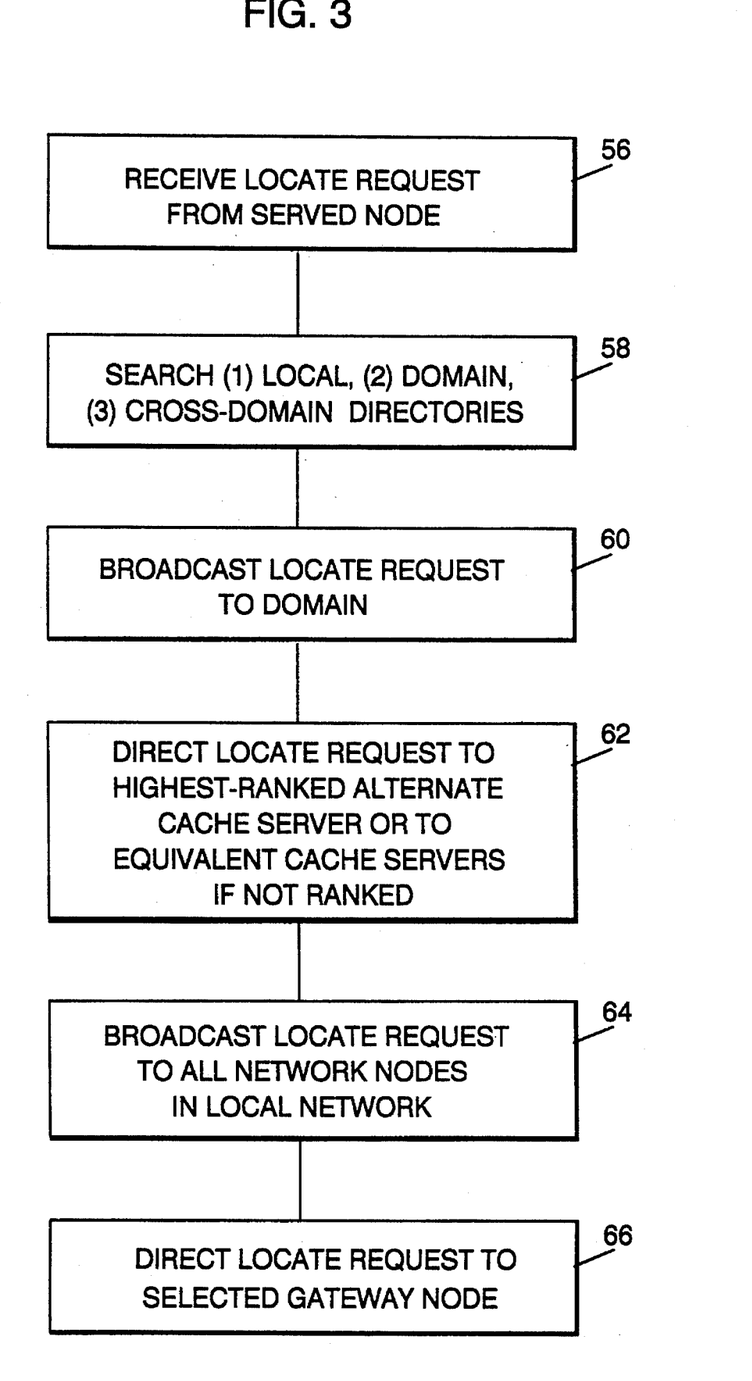
FIG. 3 depicts, at a high level, operations that are performed when practicing the present invention.

FIG. 3 is a high level flow chart of the operations that are performed at an "origin" cache server node; that is a cache server node that receives a LOCATE request in an operation 56 either from one of its own resources or from a resource served by a node within the cache server node's domain. If there is more than one cache server node in a domain, the requesting node sends the LOCATE request to the closest cache server node in one embodiment of the invention.

In an alternate embodiment of the invention, the requesting node employs a "round-robin" scheme of selecting a cache server node to which a LOCATE request is to be sent. For example, if the requesting node has a choice of two cache server nodes A and B, a first LOCATE request would be directed to cache server node A, a second would be directed to cache server node B, a third would again be directed to cache server node A, etc.

Initially, the origin cache server node searches its directory of local resources in operation 58. If the requested resource is not a local resource, the search is extended to the domain directory maintained at the origin cache server node. If the requested resource is not known to be within the domain, the search is extended to a cross-domain directory maintained by the origin cache server node.

If the directory searches do not locate the requested resource, the origin cache server node broadcasts the LOCATE request to resources within its own domain in an operation 60. The broadcast includes domain end nodes attached directly to the origin cache server node that are capable of receiving and responding to a LOCATE request.

If the requested resource is not found in operation 60, the origin cache server node directs the LOCATE request to other cache server nodes in the network in an operation 62. The steps that are followed in this redirection operation depend on the manner in which cache server nodes are implemented in the network. One way to implement cache server nodes is to define all nodes as having basically the same caching responsibility; that is, if one of the nodes caches the results of a certain type of LOCATE operation, all of the nodes would cache the results of the same type of operation. Cache server nodes implemented using this philosophy are considered functional equivalents of one another.

An alternative philosophy is to establish functionally different cache server nodes which have different caching responsibilities. For example, a low function cache server node may only cache records for resources located in directly attached network nodes while a high function cache server node may cache records relating to any resource anywhere in the network or even in adjacent networks connected through gateway nodes.

In operation 62, the origin cache server node checks to determine whether all of the alternate cache server nodes are equivalent or whether certain of the nodes have more advanced caching capabilities. If the capabilities of the alternate nodes differ, the origin cache server node directs the LOCATE request to the highest ranked alternate cache server node and allows that node to complete the search. If the alternate cache server nodes are, on the other hand, equivalents, then the origin cache server node directs the LOCATE request to the alternate cache server nodes. As will be discussed in more detail later, either a simultaneous or a sequential approach may be followed in directing the LOCATE request to the alternate, equivalent cache server nodes.

If the LOCATE request is not satisfied in operation 62, the origin cache server node then broadcasts the request to all network nodes in the network in an operation 64. In the absence of a suitable response from the network nodes, the LOCATE request is then directed in an operation 66 to a selected gateway node to permit searches for the resource in, adjacent networks.

FIG. 4, consisting of FIGS. 4A through 4E taken together, is a more detailed flow chart of operations performed at an origin cache server node upon receipt of a request to locate a specified target resource. An origin cache server node may receive such requests from either of two types of external sources: a network node or a domain end node served by the origin cache server node. An "internal" LOCATE request may also be generated within the cache server node by software resident at the node.

Figure 4A:
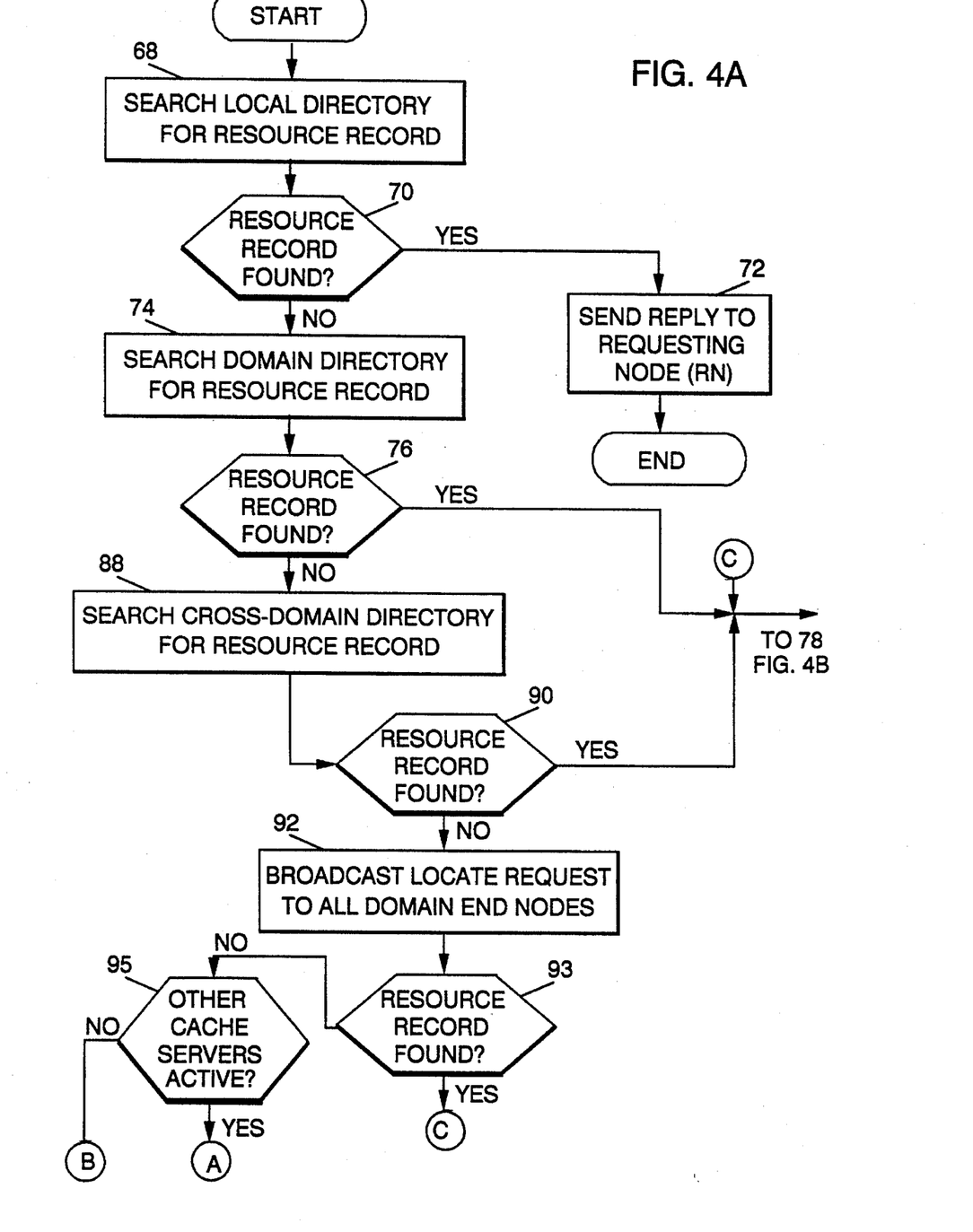

Upon receipt of a LOCATE request from any of these sources, the origin cache server node initially searches its directory of local resources in an operation 68 for a record for the target resource. If a target resource record is found in operation 70, the origin cache server node returns the requested information directly to the requesting node in an operation 72 and the LOCATE process is ended.

If operation 70 indicates the local directory does not have a target resource record, the search is extended in operation 74 to the domain directory maintained at the origin cache server node. If operation 76 indicates that a target resource record exists in the domain directory, an operation 78 is performed to determine whether the information in the target resource record must be verified.

The conditions under which verification must be obtained are outside the scope of this application. Generally, verification will be requested where it is critical that any session between source and target resources be established without failures or where there is reason to believe that cached data may be suspect. An example of suspect data is extremely old cached data. For purposes of this invention, it is important only to know whether verification is required, not why it is required or even exactly how it is performed. As a general matter, however, verification requires that a LOCATE request be directed to the node identified in the resource record as owning the target resource. That node is either assumed to have current resource information or may actually query the resource to obtain such information.

If verification is required, verification is performed in an operation 84. The information (resource location, availability and other characteristics) is then used to update the origin cache server node's domain directory in an operation 85. The verified information is returned to the requesting node in an operation 86.

If operation 78 shows that verification is not required, the retrieved information is used in an operation 80 to update records cached in an appropriate directory at the origin cache server node. The unverified information is then returned to the requesting node in an operation 82.

In the process, as described thus far, the caching operations 80 and 85 are trivial as the resource record is assumed to be found in the same directory in which results would be cached. However, the process beginning with operation 78 is employed in a number of instances when the present invention is practiced. The caching operations are significant in many instances, as will be evident in following text.

To simplify the text, the verify/cache operations beginning with operation 78 and ending either with operation 82 or 86 are referred to as a verify/cache routine 87 in the remainder of this description and the descriptions of the steps performed in the routine 87 are not repeated at each reference.

If the target resource record is not found in the domain directory, the cross-domain directory in the origin cache server node is searched in an operation 88. If a target resource record is found, operation 90 branches to the verify/cache routine 87 described earlier.

If none of the directories maintained at the cache server node contains a target resource record, the origin cache server node then broadcasts a LOCATE resource to all of the resources in its domain in operation 92. If check 94 shows the target resource is found in the domain, the verify/cache routine 87 is called.

Figure 4B:
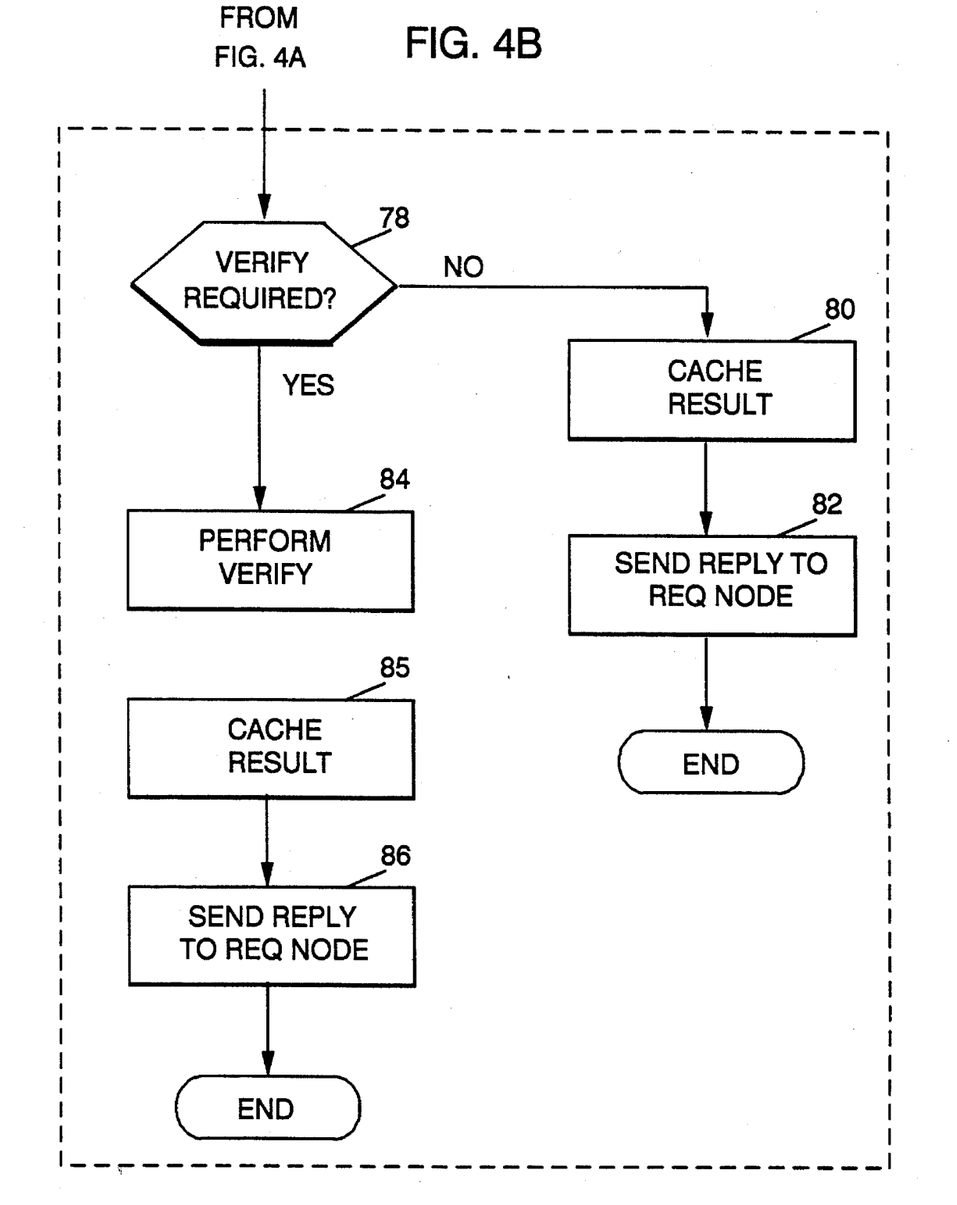
Figure 4C:
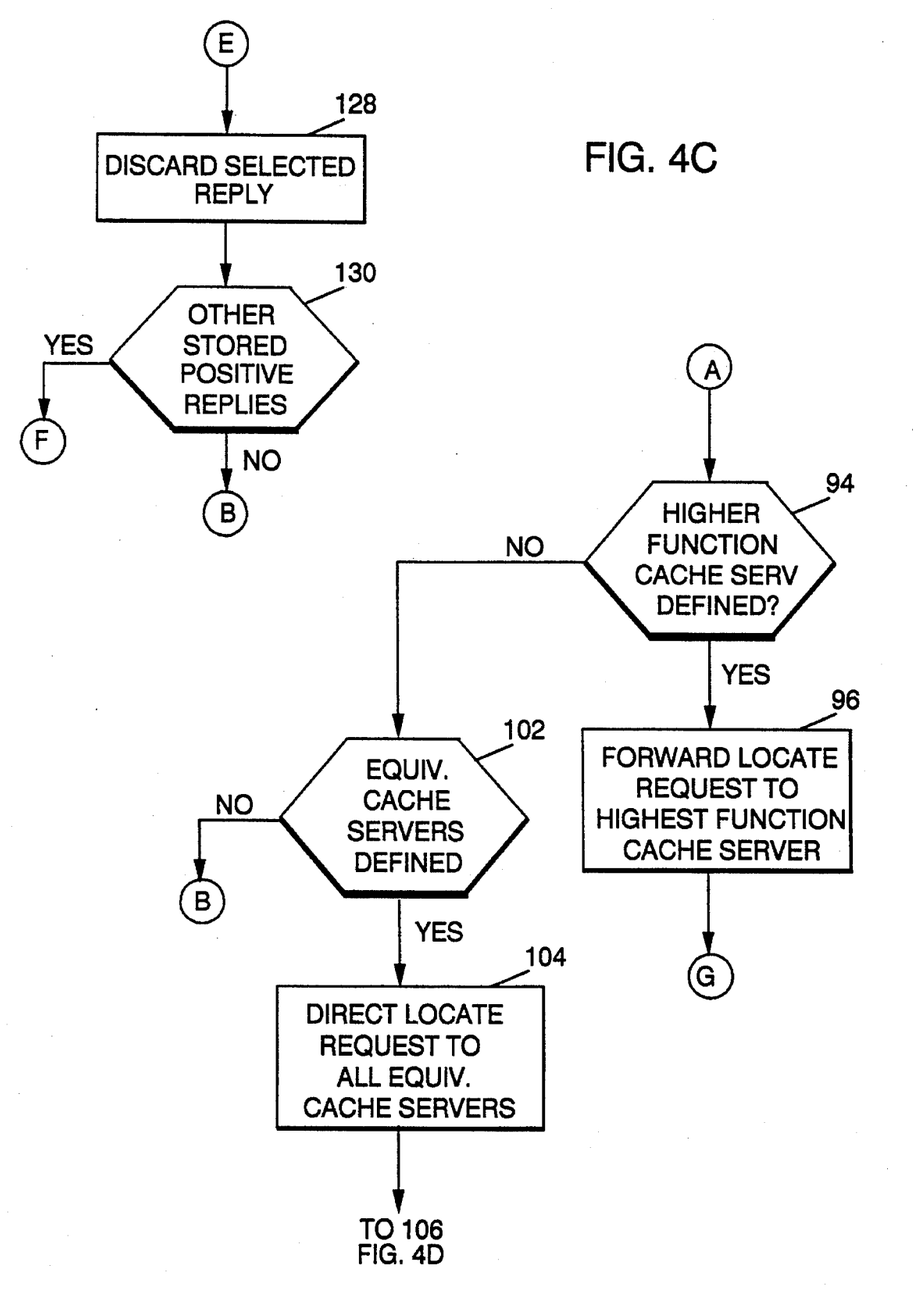

If, however, the broadcast search to the domain fails to find the target resource, an operation 95 checks whether other cache server nodes are currently active. While the existence of multiple cache server nodes is assumed, the operation 95 is necessary as the possibility exists that other cache server nodes may be out of service at the time of the current LOCATE request.

Assuming other cache server nodes are active, a check 94 is made to determine whether one of those alternate cache server nodes is defined as having advanced caching capabilities. Assuming the alternate cache server nodes are defined as having different capabilities, the LOCATE request is directed in operation 96 to the most advanced cache server node that is available. The designated cache server node completes the search for the target resource. If a positive reply is received, the verify/cache routine 87 is invoked. If no positive reply is received, a negative record is created for the cross-domain directory and a negative reply is returned to the requesting node.

If operation 94 does not reveal the existence of more advanced alternate cache server nodes, a check 102 is made to determine whether the network contains functionally equivalent cache server nodes. If such nodes exist, the origin cache server node directs the LOCATE request to all such nodes simultaneously in operation 104 and waits for replies. If a response from one of the alternate cache server nodes indicates that the target resource exists but is not within the domain of any of the active cache server nodes, then operation 106 causes a verification request to be directed immediately (in operation 108) to the resource location identified in the reply.

If the directed verify succeeds in establishing that the target resource exists and is available at the identified location (operation 110), the verified results are cached (operation 112) and the resource information is returned to the requesting node in an operation 114.

Since a LOCATE request directed to multiple equivalent cache server nodes is likely to result in multiple replies, the origin cache server node continues to process replies received from those nodes even while attempting to verify resource information about a resource outside a cache server node domain. Operation 116 compares new replies with previously received (or older) replies. Where a new reply is identical to an older reply, the new reply is discarded. Where a new reply indicates a target resource exists but contains different information about the location or characteristics of the resource, the new reply is temporarily cached. Negative replies are discarded.

When all replies are received and assuming the failure of any attempt to verify information about a non-domain resource in operations 108 and 110, the origin cache server node determines whether it has received and temporarily cached positive replies from one or more of the alternate equivalent cache server nodes. If no positive replies are cached (that is, no alternate cache server contains a record indicating the target resource exists and may be available), the search is extended as described below.

If positive replies from alternate cache server nodes are cached, one of those replies is retrieved in an operation 124 and an attempt is made to verify the information contained in the reply. If the verification attempt fails, the selected reply is discarded in operation 128 and a check 130 is made for other stored but unprocessed positive replies. Each stored reply is processed until the information in one can be verified or until all replies have been processed without successfully verifying the information in any reply.

If one of the stored replies is successfully verified, the results are cached in the cross-domain directory of the origin cache server node in an operation 112 and a reply containing the necessary information is returned to the requesting node in an operation 114.

Figure 4D:
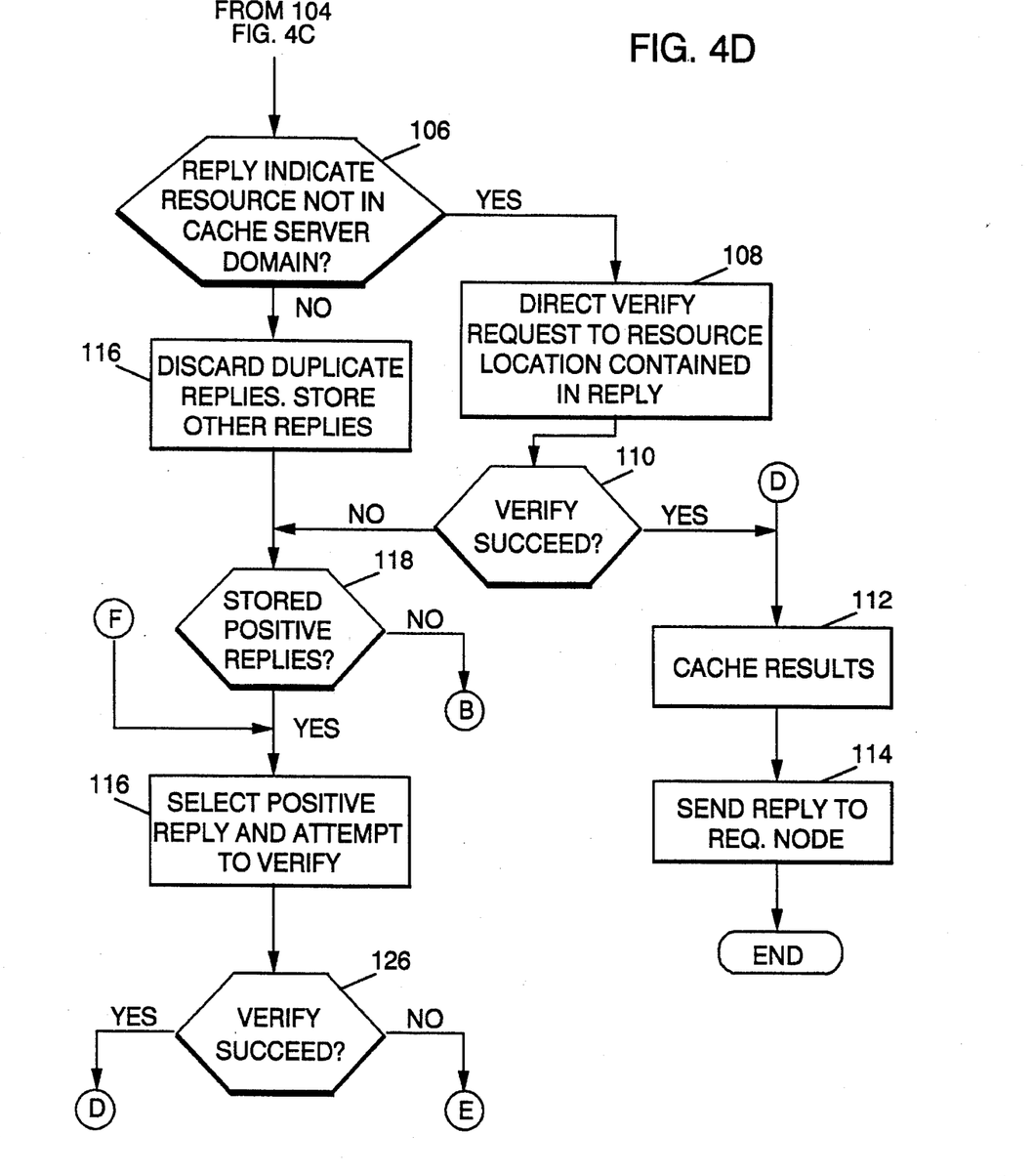

If a suitable reply does not result from the searches of alternate equivalent cache server nodes, the search operation is extended. In a preliminary step 150, the NETID or identity of the network to which the LOCATE request was to be extended is compared to the NETID for the network in which the origin cache server is located. If a match is found, the LOCATE request is then broadcast in an operation 152 to all of the network nodes in the entire network. This step is considered necessary because the network nodes may contain resource records that, for one reason or another, have not been transferred to a cache server node.

If the network broadcast causes a positive reply to be returned to the origin cache server node, check 154 causes the verify/cache routine 87 to be invoked. If the network broadcast indicates the target resource is either not known or not available in the network, this result is cached in the cross-domain directory of the origin cache server in an operation 156. A negative reply is returned (operation 158) to the requesting node.

Figure 4E:
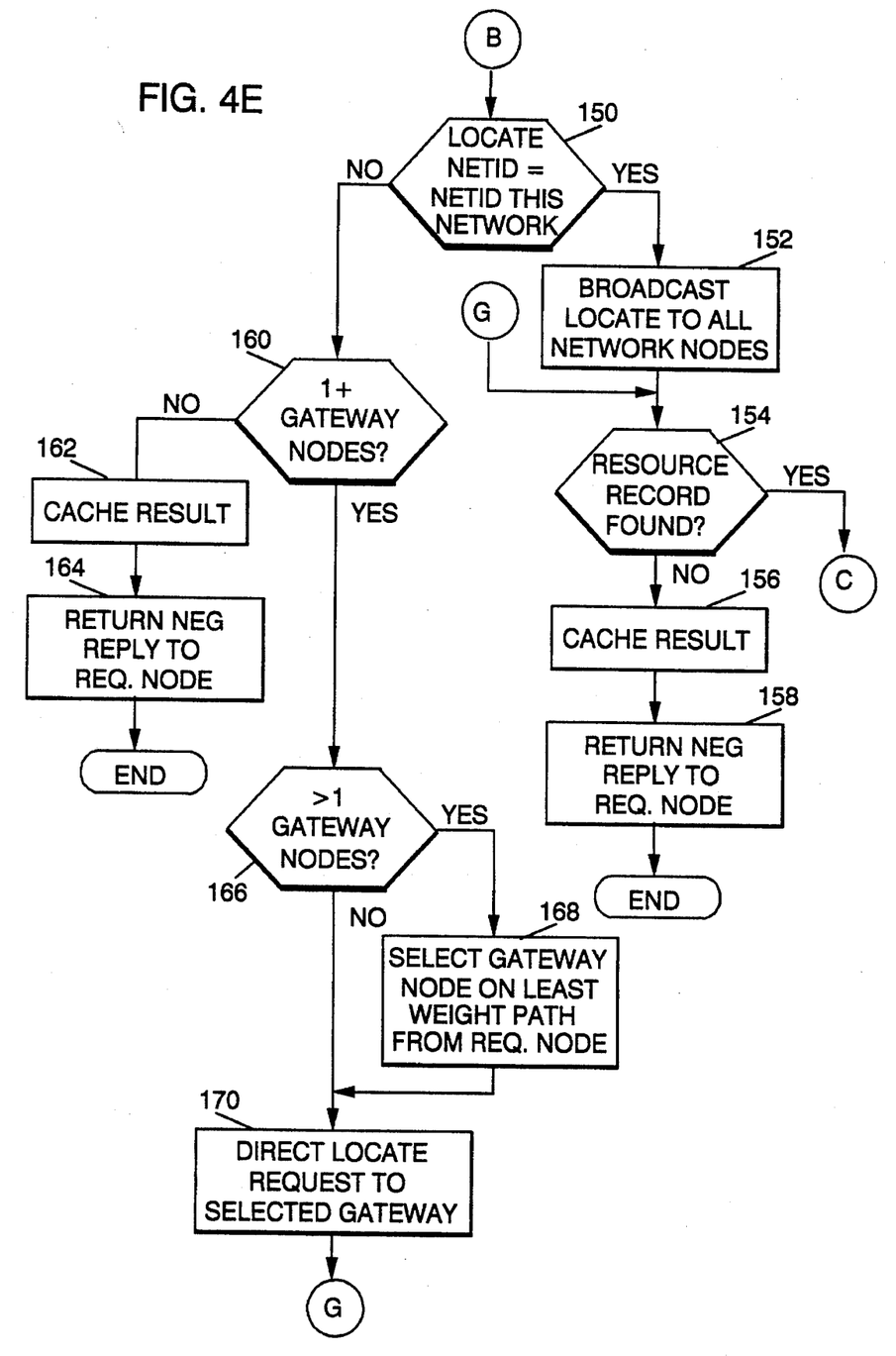

If the NETID check in operation 150 shows that the LOCATE request is directed to a different network, a check 160 is made to determine if one or more gateway nodes are connected to the local network. If no such nodes are identified, a record is created (operation 162) in the cross-domain directory that indicates the resource is unknown or unavailable. A negative reply is returned to the requesting node in an operation 164.

If check 160 reveals the existence of one or more gateway nodes, a subsequent check 166 is made to determine if there is more than one available gateway node. If there is, the origin cache server node selects the closest gateway node; that is, the gateway node that is on the least weight path from the origin cache server node. The LOCATE request is directed to the selected gateway node in an operation 170. If a positive reply is received, the verify/cache routine 87 is invoked. If no positive reply is received, a negative record is created for the cross-domain directory and a negative reply is returned to the requesting node.

Figure 5:
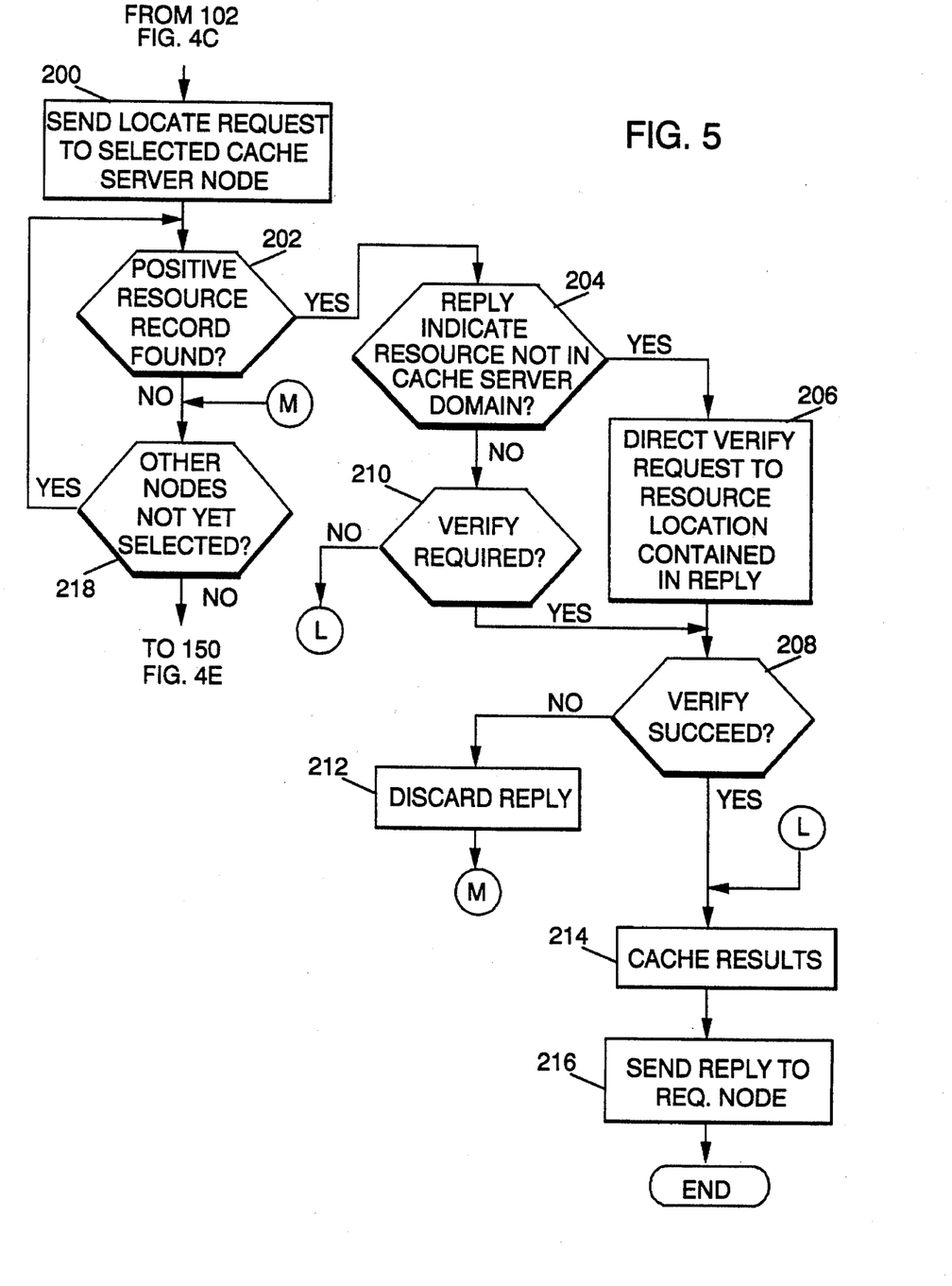
FIG. 5 is a flow chart of an alternate process for directing LOCATE requests to equivalent, alternate cache server nodes within the overall process defined by FIG. 4.

The process described with reference to FIG. 4B assumes a simultaneous broadcast of a LOCATE request to equivalent, alternate cache server nodes. FIG. 5 is a flow chart of an alternate process for accessing equivalent cache server nodes. The steps illustrated in FIG. 5 replace all of the process steps which directly follow operation 102 in FIG. 4, which is a check for the existence of equivalent cache server nodes.

One of the equivalent nodes is selected in operation 200 and the LOCATE request is directed to that node. If an operation 202 shows that a positive reply or resource record is returned from the selected node, then a further check 204 is made to determine whether the resource identified in the reply is outside the domain of any known cache server node. If the resource is outside a cache server node domain, a verify request is immediately directed to the identified resource location in an operation 206. If the verify succeeds (operation 208), the results are cached in the cross-domain directory of the origin cache server node in operation 214. A positive reply is returned to the requesting node in operation 216. If the verification fails, the reply is discarded in an operation 212 and the process branches to an operation 218, which checks to see if there are equivalent cache server nodes which have not yet been selected.

If operation 204 indicates the resource is in the domain of an alternate cache server node, a check 210 is made to determine whether the resource information is to be verified. If verification is not required, the process branches directly to operation 214, discussed earlier. If verification is required, a verification attempt is made before the previously-discussed check 208 is made to see if the verification was successful.

While it may not be self-evident from FIG. 5, two asynchronous processes may occur simultaneously. If one of the replies indicates the target resource exists outside the cache server domain, the verify/cache operations generated as a consequence of that reply proceed asynchronously of any verify/cache operations which occur as the result of one or more replies indicating the target resource exists within a cache server domain. The operations represented by FIG. 5 are terminated by the first acceptable reply, whether that reply indicates the target resource is inside or outside of a cache server domain.

While there has been described what is considered to be a preferred embodiment of the present invention, variations and modifications in that embodiment will occur to those skilled in the art once they become aware of the basic inventive concepts. Therefore, it is intended that the appended claims shall be construed to include not only the preferred embodiment but all such variations and modifications as may fall within the true spirit and scope of the invention.

We claim:

1. In a computer network which includes a plurality of nodes, two or more of which are cache server nodes which store entries representing the location and characteristics of certain network resources, each of the plurality of nodes either being served by a cache server node or being a cache server node, all nodes served by a particular cache server node being defined as being within the domain of that cache server node, a method of locating a target resource in response to a locate request from one of the nodes, the method being performed at the cache server node which serves the requesting node and comprising the steps of:

(a) searching resource directories maintained at the cache server node for an acceptable entry defining the location and characteristics of the target resource;

(b) if no acceptable entry is found in the cache server node resource directories, broadcasting the locate request to all nodes within the cache server node's domain:

(c) if no acceptable entry is found in the directories of nodes within the cache server node's domain, directing the locate request to one or more alternate cache server nodes in the network, said directing step further comprising the steps of
      determining whether alternate cache server nodes are categorized by levels of capabilities in maintaining resource records,
      if the alternate cache server nodes are so categorized, directing the locate request to the cache server node determined to have the highest level of capability,
      if the alternate cache server nodes are not so categorized, then directing the locate request to all of the cache server nodes simultaneously; and (d) if no acceptable reply is returned from the cache server nodes to which the locate request was directed, then broadcasting the locate request to all other nodes in the network to determine if any of said nodes include a record of the target resource.

2. A method as defined in claim 1 wherein the computer network is connected to one or more gateway nodes linking the network to other networks, said method including the additional step of directing the locate request to at least one gateway node if the preceding steps do not yield acceptable results.

3. A method as defined in either of claims 1 and 2 wherein the step of directing the locate request to one or more of the other cache server nodes further comprises the steps of:

(a) determining whether alternate cache server nodes are categorized by levels of capabilities in maintaining resource records;

(b) if the alternate cache server nodes are so categorized, directing the locate request to the cache server node determined to have the highest level of capability;

(c) if the alternate cache server nodes are not so categorized, then directing the locate request to the alternate cache server nodes in succession until a suitable reply is received from one of said nodes or until all said nodes have received the locate request.

4. In a computer network which includes a plurality of nodes, two or more of which are cache server nodes which store entries representing the location and characteristics of certain network resources; each of the plurality of nodes either being served by a cache server node or being a cache server node, a system for locating a target resource in response to a locate request from one of the nodes, said system being included in the cache server node which serves the requesting node and comprising:

(a) means responsive to the receipt of the locate request to search resource directories maintained at the cache server node for an acceptable entry defining the location and characteristics of the target resource;

(b) means responsive to the absence of a suitable entry in the cache server node resource directories to direct the locate request to one or more alternate cache server nodes in the network, said means further comprising
means for determining whether one of the alternate cache server nodes is defined as being functionally superior to the other alternate cache server nodes,
means responsive to a determination that one of the alternate cache server nodes is defined as functionally superior to direct the locate request to that cache server node, and
means responsive in the absence of a defined functionally superior cache server node to direct the locate request to all alternate cache server nodes simultaneously; and (c) means responsive in the absence of an acceptable reply from the alternate cache server nodes to which the locate request was directed for broadcasting the locate request to all other nodes in the network to determine if any of said nodes include a record of the target resource.

5. A cache server node for use in a computer network which includes a plurality of nodes, each of which is either served by a cache server node or is a cache server node, each of said cache server nodes storing entries representing the location and characteristics of certain network resources and comprising:

(a) means responsive to the receipt of allocate request from a requesting node that a specified target resource be located to search resource directories maintained at the cache server node for an acceptable entry defining the location and characteristics of the target resource;

(b) means responsive to the absence of an acceptable entry in the cache server node resource directories to direct the locate request to one or more alternate cache server nodes in the network, said means comprising
means for determining whether one of the alternate cache server nodes is defined as being functionally superior to the other alternate cache server nodes,
means responsive to a determination that one of the alternate cache server nodes is defined as functionally superior to direct the locate request to that cache server node,
means responsive in the absence of a defined functionally superior cache server node to direct the locate request to all alternate cache server nodes simultaneously; and (c) means responsive in the absence of an acceptable reply from the alternate cache server nodes for broadcasting the locate request to all other nodes in the network to determine if any of said nodes include a record of the target resource.

6. In a computer network which includes a plurality of nodes, two or more of which are cache server nodes which store entries representing the location and characteristics of certain network resources, each of the plurality of nodes either being served by a cache server node or being a cache server node, a system for locating a target resource in response to a locate request from one of the nodes, said system being included in the cache server node which serves the requesting node and comprising:

(a) means responsive to the receipt of the locate request to search resource directories maintained at the cache server node for an acceptable entry defining the location and characteristics of the target resource;

(b) means responsive to the absence of a suitable entry in the cache server node resource directories to direct the locate request to one or more alternate cache server nodes in the network, said means further comprising
means for determining whether one of the alternate cache server nodes is defined as being functionally superior to the other alternate cache server nodes,
means responsive to a determination that one of the alternate cache server nodes is defined as functionally superior to direct the locate request to that cache server node, and
means responsive in the absence of a defined functionally superior cache server node to direct the locate request to the alternate cache server nodes in succession until an acceptable reply is received or until the locate request has been directed to all of said alternate cache server nodes; and (c) means responsive in the absence of an acceptable reply from the alternate cache server nodes to which the locate request was directed for broadcasting the locate request to all other nodes in the network to determine if any of said nodes include a record of the target resource.

7. A cache server node for use in a computer network which includes a plurality of nodes, each of which is either served by a cache server node or is a cache server node, each of said cache server nodes storing entries representing the location and characteristics of certain network resources and comprising:

(a) means responsive to the receipt of a locate request from a requesting node that a specified target resource be located to search resource directories maintained at the cache server node for tan acceptable entry defining the location and characteristics of the target resource;

(b) means responsive to the absence of an acceptable entry in the cache server node resource directories to direct the locate request to one or more alternate cache server nodes in the network, said means comprising
means for determining whether one of the alternate cache server nodes is defined as being functionally superior to the other alternate cache server nodes,
means responsive to a determination that one of the alternate cache server nodes is defined as functionally superior to direct the locate request to that cache server node,
means responsive in the absence of a defined functionally superior cache server node to direct the locate request to the alternate cache server nodes in succession until an acceptable reply is received from one of said alternate cache server nodes or until the locate request has been directed to all of said alternate cache server nodes; and (c) means responsive in the absence of an acceptable reply from the alternate cache server nodes for broadcasting the locate request to all other nodes in the network to determine if any of said nodes include a record of the target resource.

* * * * *